US008776227B1

(12) United States Patent
Glick et al.

(10) Patent No.: US 8,776,227 B1
(45) Date of Patent: Jul. 8, 2014

(54) USER INTERFACE BASED MALWARE DETECTION

(75) Inventors: Adam L. Glick, Culver City, CA (US); Spencer Smith, El Segundo, CA (US); Nicholas R. Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 307 days.

(21) Appl. No.: 12/968,206

(22) Filed: Dec. 14, 2010

Related U.S. Application Data

(60) Provisional application No. 61/405,628, filed on Oct. 21, 2010.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/23

(58) Field of Classification Search
USPC .......................................................... 726/23
See application file for complete search history.

(56) References Cited

U.S. PATENT DOCUMENTS

| 2006/0090080 | A1* | 4/2006 | Pearson et al. ................. 713/187 |
| 2006/0090195 | A1* | 4/2006 | Pearson et al. ..................... 726/3 |
| 2008/0046975 | A1* | 2/2008 | Boss et al. ........................... 726/4 |
| 2009/0089879 | A1* | 4/2009 | Wang et al. ....................... 726/24 |
| 2009/0158430 | A1* | 6/2009 | Borders ............................ 726/23 |
| 2011/0047620 | A1* | 2/2011 | Mahaffey et al. ................ 726/23 |
| 2011/0173698 | A1* | 7/2011 | Polyakov et al. ................ 726/23 |
| 2012/0066346 | A1* | 3/2012 | Virmani et al. ................ 709/219 |

OTHER PUBLICATIONS

Lu, L. et al., "Blade: An Attack-Agnostic Approach for Preventing Drive-By Malware Infections," CCS'10, ACM, Oct. 4-8, 2010, pp. 1-11.
Rajab, M.A. et al., "The Nocebo* Effect on the Web: An Analysis of Fake Anti-Virus Distribution," $3^{rd}$ USENIX Workshop on Large-Scale Exploits and Emergent Threats, Apr. 2010, 9 pages.
Xie, L. et al., "pBMDS: A Behavior-Based Malware Detection System for Cellphone Devices," WiSec'10, ACM, Mar. 22-24, 2010, 12 pages.

* cited by examiner

*Primary Examiner* — Kambiz Zand
*Assistant Examiner* — Stephen Sanders
(74) *Attorney, Agent, or Firm* — Fenwick & West LLP

(57) ABSTRACT

Malware with fake or misleading anti-malware user interfaces (UIs) are detected. Processes running on a computer system are monitored and their window creation events are detected. The structures of the created windows are retrieved to detect presence of UI features that are commonly presented in known fake or misleading anti-malware UIs ("fakeAVUIs"). If a window includes a UI feature commonly presented in known fakeAVUIs, that window is determined suspicious and additional tests are applied to determine the validity of information in the window. If the information in the window is determined invalid, then the process that created the window is determined to be malware and a remediating action is applied to the process.

19 Claims, 8 Drawing Sheets

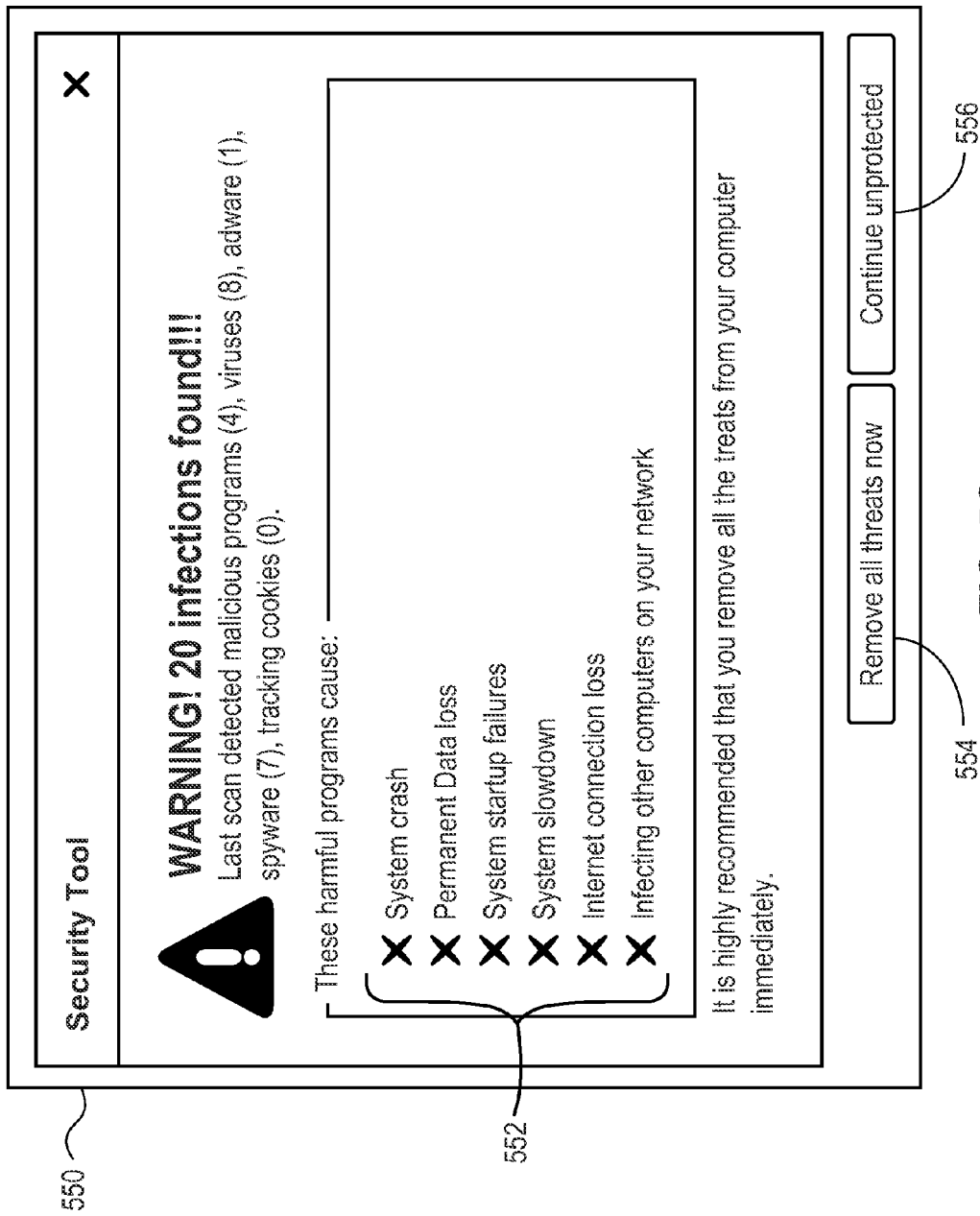

USER INTERFACE BASED MALWARE DETECTION

CROSS REFERENCE TO RELATED APPLICATION

This application claims the benefit of U.S. Provisional Patent Application Ser. No. 61/405,628, entitled "User Interface Based Malware Detection," filed on Oct. 21, 2010, which is hereby incorporated by reference in its entirety.

BACKGROUND

1. Field of Disclosure

The disclosure generally relates to the field of computer security, in particular to detecting malicious software.

2. Description of the Related Art

Anti-malware applications often display user interfaces (UIs) to provide users with status/progress information. Because computers play an important role in people's daily life, computer users often pay close attention to such a UI. An increasing amount of malware has evolved to display a fake or misleading anti-malware UI (also called a "fakeAVUI") resembling the UIs of the legitimate anti-malware applications. The fakeAVUI typically includes false alarming messages to coerce the viewers to take certain detrimental actions (e.g., purchasing rogue security software).

Existing malware detection applications are not effective in detecting malware with a fakeAVUI. For example, many existing malware detection techniques consider having a UI as an indicator of the underlying application being legitimate, and thus would not detect malware with a fakeAVUI.

Accordingly, there is a need for new techniques that can reliably detect malware with a fakeAVUI.

SUMMARY

Embodiments of the present disclosure include methods (and corresponding systems and computer program products) for detecting malware with a fake or misleading anti-malware user interface.

One aspect of the present disclosure is a computer-implemented method for detecting malware on a computer system, comprising: detecting a window created by a process running on the computer system; determining whether the window may be a fake anti-malware user interface (UI) based on whether the window comprises a UI feature included in a known fake anti-malware UI; responsive to determining that the window may be a fake anti-malware UI, determining whether information displayed in the window is valid; and responsive to a determination that the information displayed in the window is invalid, classifying the process as malware and applying a remediating action to the process.

Another aspect of the present disclosure is a computer system for detecting malware, comprising: a non-transitory computer-readable storage medium comprising executable computer program code for: detecting a window created by a process running on the computer system; determining whether the window may be a fake anti-malware user interface (UI) based on whether the window comprises a UI feature included in a known fake anti-malware UI; responsive to determining that the window may be a fake anti-malware UI, determining whether information displayed in the window is valid; and responsive to a determination that the information displayed in the window is invalid, classifying the process as malware and applying a remediating action to the process.

A third aspect of the present disclosure is a non-transitory computer-readable storage medium storing executable computer program instructions for detecting malware on a computer system, the computer program instructions comprising instructions for: detecting a window created by a process running on the computer system; determining whether the window may be a fake anti-malware user interface (UI) based on whether the window comprises a UI feature included in a known fake anti-malware UI; responsive to determining that the window may be a fake anti-malware UI, determining whether information displayed in the window is valid; and responsive to a determination that the information displayed in the window is invalid, classifying the process as malware and applying a remediating action to the process.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIGS. 5A-5D are screenshots of representative fake anti-malware user interfaces and corresponding user interface hierarchical structures, according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
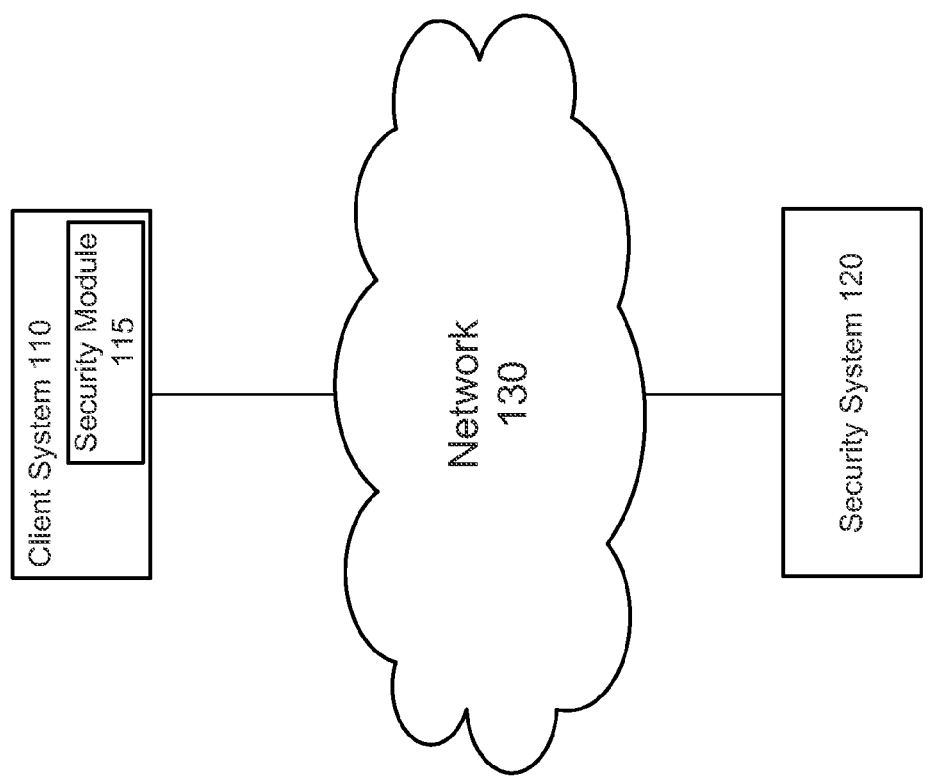
FIG. 1 is a high-level block diagram of a computing environment according to one embodiment of the present disclosure.

FIG. 1 is a high-level block diagram that illustrates a computing environment 100 for detecting malware with fake or misleading anti-malware user interfaces, according to one embodiment of the present disclosure. The term "user interface" ("UI") refers to the visual outputs generated by a process (or application) displayed or for displaying on a display device (e.g., a screen). Examples of UIs include an application window (e.g., the main window of a process/application) and a secondary/child window (e.g., a dialog window, a taskbar balloon). The term "fake or misleading anti-malware UI"

refers to a UI that purposefully resembles the UIs of legitimate anti-malware applications but includes information that is either false or misleading (e.g., displaying a fake scan progress bar for a malware scan that never takes place). In the following description, the UI is also referred to as a "window", and the fake or misleading anti-malware UI is referred to as a "fakeAVUI".

As shown in FIG. 1, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

Figure 5A:
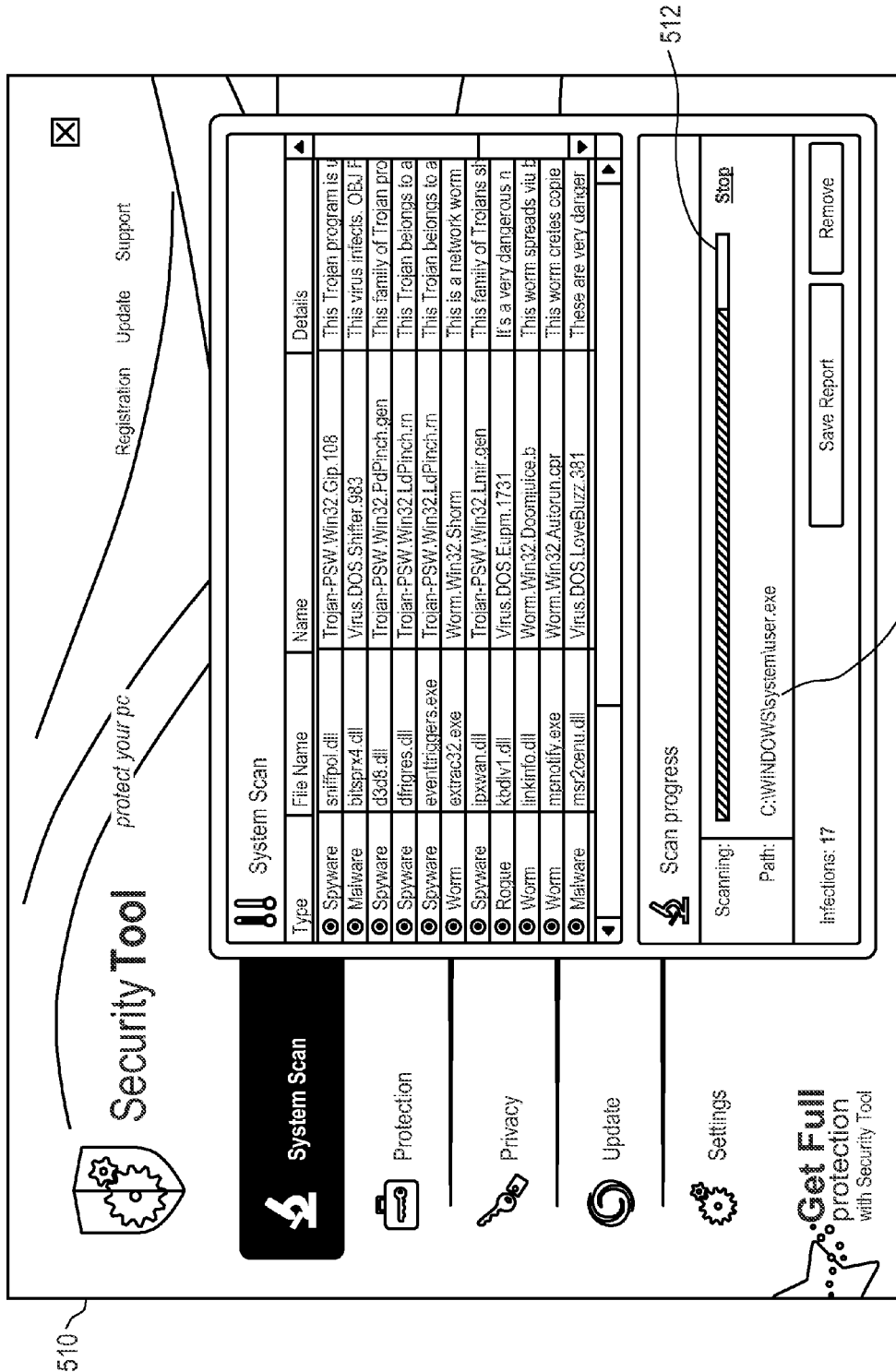

Some malware displays fakeAVUIs that purposefully resemble UIs of legitimate anti-malware applications in order to attract users' attention and coerce the users to take certain actions (e.g., purchasing/installing rogue security software). For example, a piece of malware may display a fake scan dialog 510 as shown in FIG. 5A that is designed to convince the user that a legitimate malware scan is occurring and nonexistent threats are present, and as a result coercing the user to purchase a rogue security tool.

The client system 110 executes a security module 115 for detecting the presence of malware. The security module 115 can be, for example, incorporated into the OS of the client system 110 or part of a separate comprehensive security package. In one embodiment, the security module 115 is provided by the entity that operates the security system 120.

Among other techniques, the security module 115 detects malware by monitoring processes running on the client system 110, and detecting those that generated fakeAVUIs. To detect fakeAVUIs, the security module 115 first identifies suspicious UIs (i.e., UIs that may be fakeAVUIs) based on UI patterns describing UI features that are both commonly presented in fakeAVUIs and can be efficiently detected, and then applies additional tests to the suspicious UIs and/or suspicious processes (e.g., the process that created a suspicious UI) as needed.

The security system 120 is a hardware device and/or software program configured to provide the client system 110 with information (e.g., UI patterns) allowing the security module 115 to detect and remediate malware with fakeAVUIs on the client systems 110. The UI patterns (and other information) can be created based on direct human observation of known fakeAVUIs and/or machine learning. One or more of the functions of the security system 120 can also be executed in a cloud computing environment. As used herein, cloud computing refers to a style of computing in which dynamically scalable and often virtualized resources are provided as a service over the Internet.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
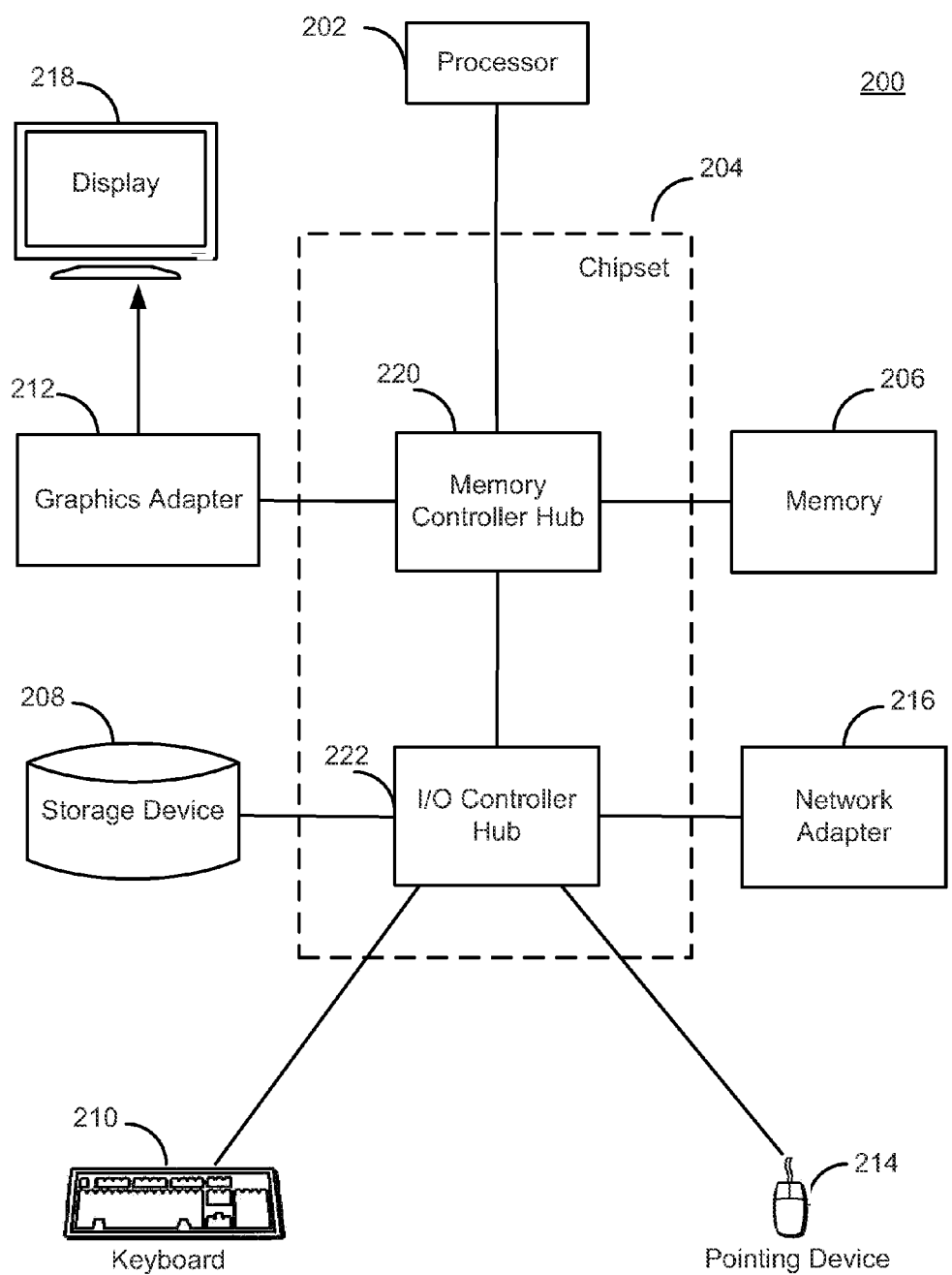
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security Module

Figure 3:
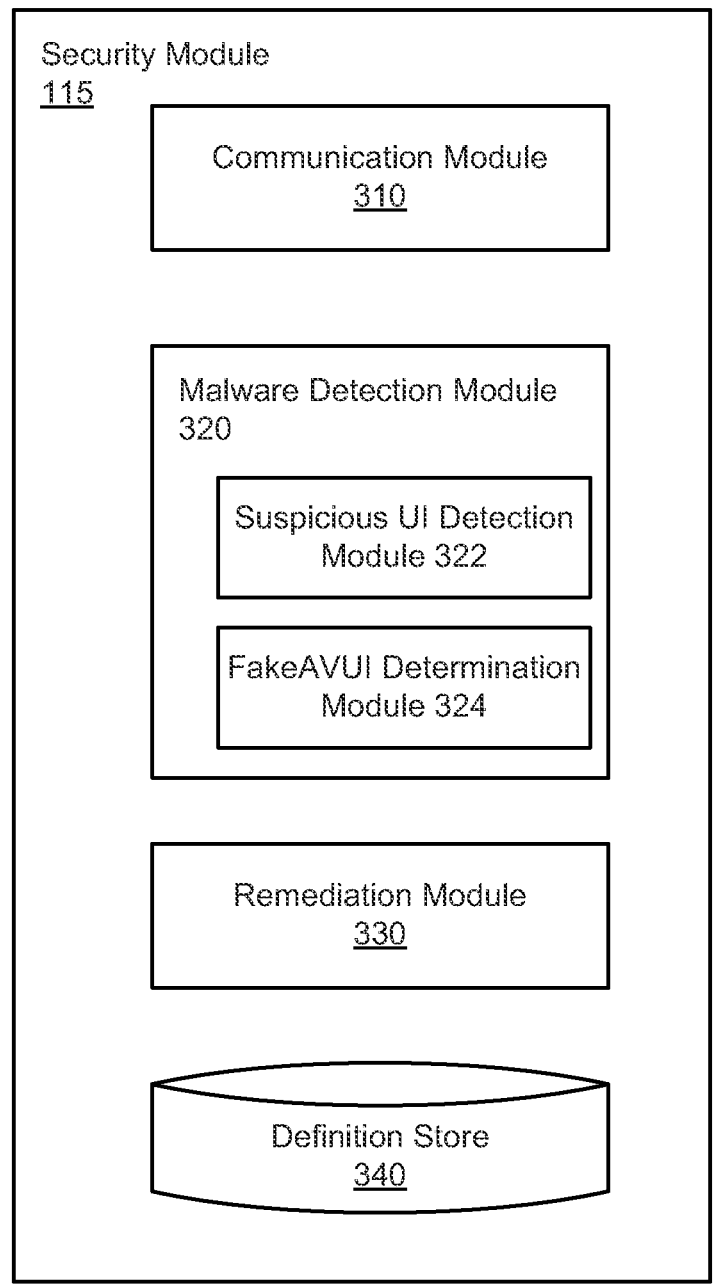
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a communication module 310, a malware detection module 320, a remediation module 330, and a data store 340.

The communication module 310 receives fakeAVUI definitions from the security system 120 and stores the received fakeAVUI definitions in the data store 340. A fakeAVUI definition is a structured collection of information designed to facilitate malware detection based on the presence of fakeAVUIs. A fakeAVUI definition includes a trigger clause and a consequence clause.

The trigger clause of a fakeAVUI definition includes a UI pattern describing UI features commonly presented in fakeAVUIs and is used for detecting suspicious UIs. It has been observed that fakeAVUIs often share similar UI features (hereinafter called "AVUI features") that are rarely present in non-anti-malware applications. Examples of AVUI features include the scan progress bar 512 and the directory path name 514 in the fake scan dialog 510 in FIG. 5A. An additional AVUI feature example is a list box 552 showing all security threats (or malware) found in a fake scan result dialog 550 as illustrated in FIG. 5C. Thus, if a window includes an AVUI feature, that window may be a fakeAVUI (i.e., a suspicious UI). As described and illustrated using examples below, a UI pattern is a collection of one or more distinguishing characteristics of one or more AVUI features that can be used to detect the presence of the AVUI features (e.g., in a window).

Figure 5B:
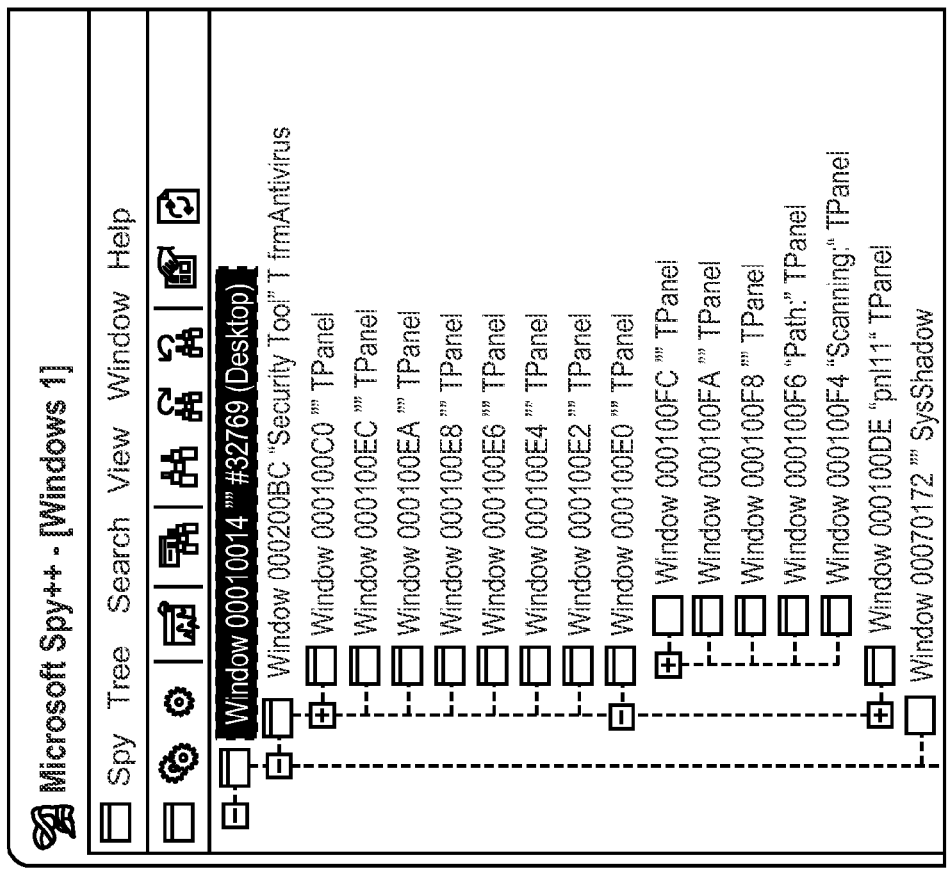
Figure 5D:
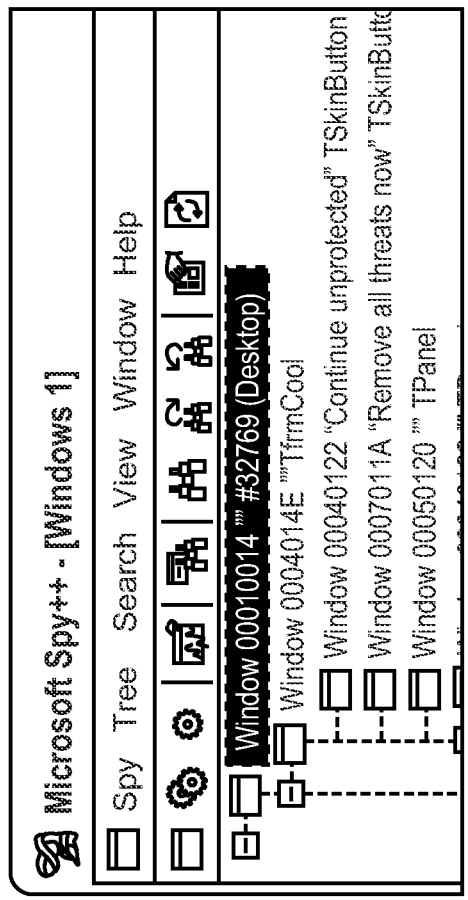

Information about UI features presented in a window can be obtained by requesting it from the operating system of the client system 110 (e.g., via application programming interface (API) function calls). For example, Microsoft Windows can provide a UI hierarchical structure (also called a "structure") that describes the UI features presented in a newly created (or displayed) window in the OS. FIG. 5B illustrates the structure for the fake scan dialog 510 in FIG. 5A. As shown in FIG. 5B, the structure includes a UI feature with a class name "TfrmAntivirus" and a text label "Security Tool" (for the fake scan dialog 510), which includes two child UI features with a class name "TPanel" and text labels "Path:" and "Scanning:" (for the scan progress bar 512 and the directory path name 514), respectively. FIG. 5D illustrates the structure for the fake scan result dialog 550 in FIG. 5C. As shown in FIG. 5D, the structure includes a UI feature with a class name "TfrmCool" (for the fake scan result dialog 550), which includes two child UI features with a class name "TSkinButton" and text labels "Continue unprotected" and "Remove all threats now" (for the two buttons 554, 556), respectively.

A UI pattern includes distinguishing characteristics of one or more AVUI features and can be used to detect the presence of these AVUI features or similar UI features with the distinguishing characteristics. Because the class names and text labels of AVUI features typically are unusual (i.e., not shared by UI features of non-anti-malware applications), they can be included in UI patterns to detect the presence of the AVUI features. For example, a UI pattern designed to detect the presence of UI features similar to the fake scan dialog 510 in FIG. 5A can be expressed as: a UI feature with a class name "TfrmAntivirus" AND a text label "Security Tool". Another example UI pattern designed to capture UI features similar to the fake scan result dialog 550 in FIG. 5C can be expressed as: a UI feature with a class name "TfrmCool" including a first child UI feature with a class name "TSkinButton" and a text label "Continue Unprotected" AND a second child UI feature with a class name "TSkinButton" and a text label "Remove all threats now". Another example UI pattern can be expressed as: a listbox with text label containing "Scan Results" and including one or more of the following: "agentdp2.dll", "Trojan-PSW-Win32.Coced.219", and "This trojan steals user passwords". Accordingly, whether a UI feature is presented in a window can be determined by matching a corresponding UI pattern to the structure of the window.

The consequence clause of a fakeAVUI definition includes additional test(s) used to classify the suspicious process (e.g., the process that created the suspicious UI) as malware or legitimate. The fact that a process created a window including an AVUI feature alone may not be sufficient to convict the process (i.e., classify it as malware) because the process may well be a legitimate anti-malware application. Examples of the additional tests may include determining whether information in the suspicious UI is valid (e.g., the file displayed as being under scan exists and is indeed being scanned), classifying the suspicious process using non-UI features such as file attributes and observed behaviors, and submitting information about the suspicious process to the security system 120 for further analysis/information.

Sometimes the UI pattern in the trigger clause alone is sufficient to convict a process. For example, if the UI pattern describes a combination of AVUI features that is only present in known fakeAVUIs, then the fact that a window matching the UI pattern alone is sufficient to classify the suspicious process as malware. For trigger clauses including such UI patterns, the corresponding consequence clauses can simply be empty, or include the resulting classification (e.g., malware) and/or applicable remediation actions (e.g., terminating the suspicious process) without including any additional test. In another embodiment, the remediation actions are not specified in the consequence clause, and are determined by the remediation module 330 instead, as described in detail below.

Referring back to FIG. 3, the malware detection module 320 detects malware in the processes running on the client system 110 based on the fakeAVUI definitions. As shown, the malware detection module 320 includes a suspicious UI detection module 322 and a fakeAVUI determination module 324.

The suspicious UI detection module 322 monitors active processes in the client system 110 and detects suspicious UIs created by the processes based on the trigger clauses of the fakeAVUI definitions. The suspicious UI detection module 322 detects windows creation events in the OS, requests and retrieves UI hierarchical structures of the newly created windows, and matches the structures with the UI patterns in the trigger clauses. If any of the structures match any of the UI patterns, then the fakeAVUI definition including that UI pattern (in its trigger clause) is deemed "triggered" by the window of the matching structure. The suspicious UI detection module 322 determines that the triggering window is a suspicious UI, and passes information about the triggered fakeAVUI definition and the triggering window to the fakeAVUI determination module 324 for further analysis.

The fakeAVUI determination module 324 determines whether the suspicious UI detected by the suspicious UI detection module 322 is a fakeAVUI by conducting additional tests as specified in the consequence clause of the triggered fakeAVUI definition. If the consequence clause specifies verifying a file scan shown in the suspicious UI, the fakeAVUI determination module 324 monitors an enumeration of files displayed in the suspicious UI (e.g., the directory path name of files displayed as being under scan) and file accesses made by the suspicious process. Based on the monitored information, the fakeAVUI determination module 324 can verify that files shown to be under scan and/or reported as infected do exist and are in fact opened and read by the associated process, which any legitimate anti-malware application would have to do in order to scan/convict the file. The fakeAVUI determination module 324 may conduct other tests as specified in the consequence clause of the triggered fakeAVUI definition, such as classifying the suspicious process using non-UI features (e.g., file attributes, observed behaviors). For efficiency purpose, the fakeAVUI determination module 324 only conducts the additional tests on suspicious processes (i.e., processes associated with suspicious UIs), and only monitors the input/output (I/O) activities of the suspicious processes in one embodiment.

The malware detection module 320 detects malware based on the outcomes from the suspicious UI detection module 322 and the fakeAVUI determination module 324. If the triggered fakeAVUI definition indicates that the trigger clause alone is sufficient to convict a suspicious process, then the malware detection module 320 classifies the suspicious process as malware without activating the fakeAVUI determination module 324.

The remediation module 330 applies an appropriate remediating/corrective action to the detected malware to prevent or control damage. Example remediating actions include terminating/quarantining the malware, suspending the malware while generating a warning message to the user, clearly marking the fakeAVUI as fake (e.g., by superimposing a message (e.g., "This message appears fake!") on the fakeAVUI), and preventing the malware from accessing any system resources and/or conducting certain actions (e.g., file downloads). The remediating action can be specified in the triggered fakeAVUI definition (in the consequence clause) or determined by the remediation module 330 based on user configuration/preference.

The data store 340 stores data used by the security module 115. Examples of such data include the received fakeAVUI definitions, the UI hierarchical structures, and information about the processes and past convictions. The data store 340 may be a relational database or any other type of database.

Overview of Methodology for the Security Module

Figure 4:
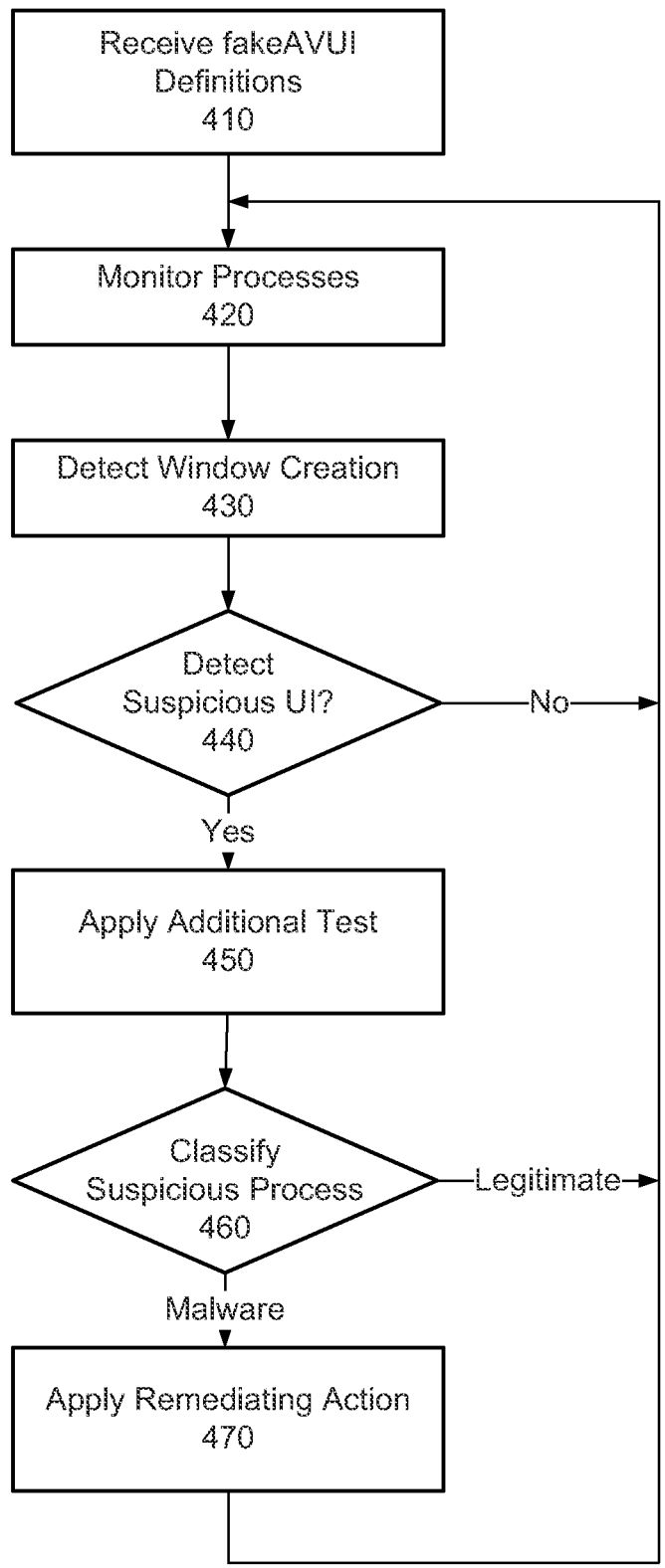
FIG. 4 is a flow diagram illustrating a process for detecting malware, according to one embodiment of the present disclosure.

FIG. 4 is a flow diagram illustrating a process 400 for the security module 115 to detect malware with fakeAVUIs, according to one embodiment. Other embodiments can perform the steps of the process 400 in different orders. Moreover, other embodiments can include different and/or additional steps than the ones described herein.

The security module 115 receives 410 fakeAVUI definitions from the security system 120 to facilitate malware detection based on the presence of fakeAVUIs. The fakeAVUI definitions can be created based on direct human observation of known fakeAVUIs and/or machine learning. An example fakeAVUI definition designed to detect fake scan dialogs includes a UI pattern (in the trigger clause) describing a progress bar and a sibling text box displaying directory path names of files currently under scan. The consequence clause of the example fakeAVUI definition specifies a test of confirming that the associated process is actually opening the files presented in the scan dialog as being under scan.

The security module 115 monitors 420 processes running on the client system 110, and detects 430 windows created by the processes. The security module 115 detects 440 suspicious UIs in the detected windows by matching UI patterns in the fakeAVUI definitions with the UI hierarchical structures of the windows. If the structure of a window matches a UI pattern of a fakeAVUI definition, then the security module 115 determines that the window is a suspicious UI. Continuing with the example fakeAVUI definition described above, if a process creates the scan dialog 510 as shown in FIG. 5A that includes both the scan progress bar 512 and the directory path name 514, the security module 115 determines that the window is a suspicious UI (because the scan dialog 510 matches the UI pattern). Otherwise if no suspicious UI is detected 440, the security module 115 continues monitoring 420 the processes.

If a window is determined suspicious, the security module 115 applies 450 additional tests as specified in the consequence clause of the triggered fakeAVUI definition, and classifies 460 the suspicious process based on the test result. If the suspicious process is classified as malware, the security module 115 applies 470 appropriate remediating action(s). Continuing with the above example, the security module 115 monitors the directory path names displayed in the text box of the suspicious window and the I/O activities of the suspicious process to determine whether the suspicious process actually accessed the files identified by the displayed directory path names. If the suspicious process did not access the files or information in the suspicious window is otherwise invalid, the security module 115 classifies 460 the suspicious process as malware and terminates 470 it.

Additional Embodiments

In additional embodiments, a fakeAVUI definition may include multiple trigger clauses with different UI patterns. In addition, the suspicious UI itself may be used as an additional feature along with other features (e.g., file attributes, observed behaviors) used by a classifier to classify processes as legitimate or malware. The described embodiments may also be used in conjunction with other malware detection techniques to achieve goals such as reducing false positives in malware detection.

Because the described embodiments use efficient mechanisms to detect suspicious UIs (by matching UI patterns to UI hierarchical structures), and only apply computationally intensive tests (e.g., verifying displayed files are actually scanned) to those processes with suspicious UIs, malware detection using the described embodiments is computationally efficient. In addition, because the AVUI features included in fakeAVUIs rarely change, and even if they do, fakeAVUI definitions can be updated relatively easily (comparing to the efforts it take to modify the malware UIs and distribute the modified malware), the described embodiment is relatively resistant to malware changes. Further, the described embodiments detect fakeAVUIs soon after it is created, and thus apply corrective action(s) before the user is misled into taking any damaging action.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting malware with fake or misleading anti-malware user interfaces. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for detecting malware on a computer system, comprising:
    detecting a window created by a process running on the computer system;
    determining whether the window may be a fake anti-malware user interface (UI) based on whether the window comprises a scan dialog including a scan progress bar indicating that a file scan is in progress;
    responsive to determining that the window may be a fake anti-malware UI, determining whether information displayed in the window is valid by determining whether the indicated file scan is in progress; and
    responsive to a determination that the information displayed in the window is invalid, classifying the process as malware and applying a remediating action to the process.

2. The method of claim 1, further comprising:
    retrieving a structure describing the scan dialog, wherein determining whether the window may be a fake anti-malware UI comprises matching a UI pattern describing the scan dialog included in the known fake anti-malware UI to the structure.

3. The method of claim 2, further comprising:
    downloading a definition from a security server, the definition comprising (1) a triggering clause that includes the UI pattern and (2) a consequence clause that includes a test for determining whether the information displayed in the window is valid,
    wherein determining whether the information displayed in the window is valid comprises determining whether the information displayed in the window is valid by applying the test in the consequence clause of the definition.

4. The method of claim 1, wherein determining whether the information displayed in the window is valid comprises:
    determining whether a file identified by a directory path name displayed in the window is accessed by the process, wherein if the file is not accessed by the process then the information displayed in the window is determined invalid.

5. The method of claim 1, wherein the scan dialog further includes a directory path name.

6. The method of claim 1, wherein the window created by the process running on the computer system further comprises a scan result dialog including a list of malware.

7. A computer system for detecting malware, comprising:
    a non-transitory computer-readable storage medium comprising executable computer program code for:
        monitoring processes running on the computer system;
        detecting a window created on a display device of the computer system by a monitored process running on the computer system;
        determining whether the window created on the display device by the monitored process may be a fake anti-malware user interface (UI) based on whether the window comprises a scan dialog including a scan progress bar indicating that a file scan is in progress;
        responsive to determining that the window created on the display device of the computer system may be a fake anti-malware UI, determining whether information displayed in the window is valid by determining whether the indicated file scan is in progress; and
        responsive to a determination that the information displayed in the window created on the display device of the computer system is invalid, classifying the process as malware and applying a remediating action to the monitored process; and
    a processor for executing the executable computer program code.

8. The computer system of claim 7, wherein the non-transitory computer-readable storage medium further comprises executable computer program code for:
    retrieving a structure describing the scan dialog, wherein determining whether the window may be a fake anti-malware UI comprises matching a UI pattern describing the scan dialog included in the known fake anti-malware UI to the structure.

9. The computer system of claim 8, wherein the non-transitory computer-readable storage medium further comprises executable computer program code for:

downloading a definition from a security server, the definition comprising (1) a triggering clause that includes the UI pattern and (2) a consequence clause that includes a test for determining whether the information displayed in the window is valid, wherein determining whether the information displayed in the window is valid comprises determining whether the information displayed in the window is valid by applying the test in the consequence clause of the definition.

10. The computer system of claim 7, wherein determining whether the information displayed in the window is valid comprises:

determining whether a file identified by a directory path name displayed in the window is accessed by the monitored process, wherein if the file is not accessed by the monitored process then the information displayed in the window is determined invalid.

11. The computer system of claim 7, wherein the a scan dialog further includes a directory path name.

12. The computer system of claim 7, wherein the window created by the process running on the computer system further comprises a scan result dialog including a list of malware.

13. A non-transitory computer-readable storage medium storing executable computer program instructions for detecting malware on a computer system, the computer program instructions comprising instructions for:

detecting a window created by a process running on the computer system;

determining whether the window may be a fake anti-malware user interface (UI) based on whether the window comprises a scan dialog including a scan progress bar indicating that a file scan is in progress;

responsive to determining that the window may be a fake anti-malware UI, determining whether information displayed in the window is valid by determining whether the indicated file scan is in progress; and responsive to a determination that the information displayed in the window is invalid, classifying the process as malware and applying a remediating action to the process.

14. The storage medium of claim 13, wherein the computer program instructions further comprise:

retrieving a structure describing the scan dialog, wherein determining whether the window may be a fake anti-malware UI comprises matching a UI pattern describing the scan dialog included in the known fake anti-malware UI to the structure.

15. The storage medium of claim 14, wherein the computer program instructions further comprise:

downloading a definition from a security server, the definition comprising (1) a triggering clause that includes the UI pattern and (2) a consequence clause that includes a test for determining whether the information displayed in the window is valid, wherein determining whether the information displayed in the window is valid comprises determining whether the information displayed in the window is valid by applying the test in the consequence clause of the definition.

16. The storage medium of claim 13, wherein determining whether the information displayed in the window is valid comprises:

determining whether a file identified by a directory path name displayed in the window is accessed by the process, wherein if the file is not accessed by the process then the information displayed in the window is determined invalid.

17. The storage medium of claim 13, wherein the a scan dialog further includes a directory path name.

18. The storage medium of claim 13, wherein the window created by the process running on the computer further comprises a scan result dialog including a list of malware.

19. The method of claim 1, wherein the information displayed in the window is invalid responsive to a determination that the indicated file scan is not in progress.

* * * * *